(No Model.)

C. A. GRISWOLD.
CORSET.

No. 392,199. Patented Nov. 6, 1888.

WITNESSES:
C. W. Benjamin
A. T. Fales

INVENTOR,
Catharine A. Griswold,
BY Arden S. Fitch,
ATTORNEY,

United States Patent Office.

CATHARINE A. GRISWOLD, OF NEW YORK, N. Y.

CORSET.

SPECIFICATION forming part of Letters Patent No. 392,199, dated November 6, 1888.

Application filed January 25, 1888. Serial No. 261,847. (No model.)

*To all whom it may concern:*

Be it known that I, CATHARINE A. GRISWOLD, of the city, county, and State of New York, a citizen of the United States, have invented an Improvement in Corsets, of which the following is a full, clear, and exact description, reference being had to the accompanying drawings, forming part of this specification.

My invention relates to corsets; and it consists in a corset provided with individual and independent stays or stiffeners, each having a widened portion about midway of its length, and thereat having an edgewise turn or reversal of direction, and extending, one or more, from an edge of the corset-body to substantially the waist-line, with the widened portion of each constituting the apex thereof, and extended somewhat across said waist-line, and with the extremities of both limbs of each stiffener terminating at one and the same edge of the corset-body, substantially as hereinafter described, and for the purpose set forth.

Figure 1:
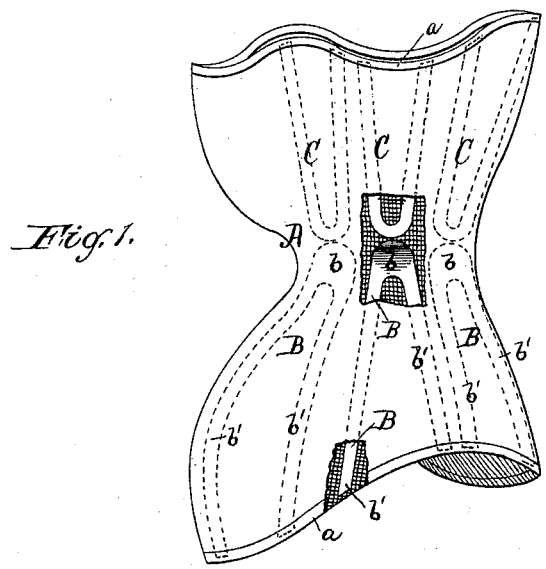
Figure 2:
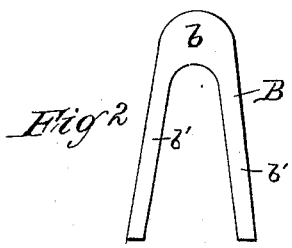

Figure 1 is a side elevation of a corset containing my invention; and Fig. 2 is a view in plan of a steel, bone, or stiffener fabricated in conformity to my invention.

A represents the corset-body.

At B are shown steels, bones, stays, or stiffeners, each of which has that portion which is about midway of its length widened, as shown at $b$, and in each is an edgewise turn or reversal of direction at and comprising the said widened portion, thus constituting a steel or stiffener which has the two limbs $b'$ $b'$ and the widened portion $b$, constituting an apex, as shown plainly in Fig. 2. The edgewise turn in the stiffener is preferably in the form of a curvated bend, as shown. Stiffeners such as described extend individually and independently of each other in or upon the corset-body, one or more, from an edge thereof, with their widened apices reaching to and somewhat beyond the waist-line of the corset, and so that said widened apices extend or lap flatwise across said waist-line, as shown in Fig. 1, and with the extremities of both limbs of each stiffener terminating at or near one and the same edge of the corset, and preferably immediately upon the edge, where they may be inclosed by the binding $a$.

It is preferable that the described stiffeners B should extend from the bottom edge of the corset, one or more, to and beyond the waist-line, as set forth; and it is furthermore preferable that said individual and independent stiffeners should extend successively in a series along and from said lower edge, all as shown in Fig. 1; but it is evident that the described stiffeners may extend similarly from the top edge of the corset to and somewhat beyond the waist-line without substantial variation from the essential feature of my invention. It is also preferable that the steels, bones, or stiffeners, which are in or upon that portion of the corset-body not occupied by the hereinbefore particularly described stiffeners B, should be arranged as shown at C, extending from the upper or opposite edge of the corset, one or more, in correspondence and opposedly to each of the independent and separate stiffeners B, and reaching to, at, or near the apices of said stiffeners; and I find it desirable that said stiffeners C should be fabricated with an edgewise turn or reversal of direction, as shown at $c$, constituting an apex which is located opposedly to but separate from an apex of the stiffeners B, both the extremities of each stiffener C terminating on one and the same said edge of the corset-body.

The described stiffeners may be seated and incorporated in correspondingly-shaped pockets constituted in and by the material of the corset-body itself by means of rows of stitching passing through the double thicknesses of the said material; or said stiffeners may be applied to and secured upon the surface of the corset-body in the form of "overlays."

It is evident that in a corset provided with the described stiffeners B, having the widened apex portion extending individually and independently flatwise across the waist-line, the said widened apex portion of the stiffeners will serve to support the person of the wearer at and around the waist, and that such apex portion of each may be bent flatwise to conform to the person at the waist, as shown at $b$, Fig. 1, while at the same time the liability of the stiffeners B to fracture at the waist, owing to their extending across the waist-line, is reduced to a minimum by reason of the wideness and consequent augmented strength of the apex portions, as described. It is also evident that when the stiffeners C, as described, are employed in conjunction with the independent and separate stiffeners B, the corset not only possesses the advantageous features above recited, but also the person of the wearer is permitted a freedom of motion at the waist, due to the hingewise joint there constituted by the opposed apices of the stiffeners B and C.

What I claim as my invention, and desire to secure by Letters Patent, is—

1. A corset provided with stays, each having a widened portion about midway of its length, and thereat an edgewise turn or reversal of direction, and extending individually, independently, and successively in a series along and from an edge of the corset-body to and with the widened apex portion of each stiffener reaching across and lapping the waist-line, and with the extremities of both the limbs of all the stiffeners terminating at one and the same edge of the corset-body, as and for the purpose set forth.

2. A corset provided with separate and individual stays, each having a widened portion about midway of its length, and thereat an edgewise turn or reversal of direction, and extending, one or more, from one edge of the corset-body to and with the widened apex portion of each reaching across and lapping the waist-line, together with stays extending, one or more, from the opposite edge of the corset in correspondence to and independently of said edgewise-bent stiffeners, and located oppositely to the apices thereof, and with the extremities of each said stiffeners terminating at one and the same edge of the corset, substantially as and for the purpose set forth.

CATHARINE A. GRISWOLD.

Witnesses:
JOHN J. ENNIS,
JAMES McINTYRE.